United States Patent [19]
Chae

[11] Patent Number: 6,075,663
[45] Date of Patent: Jun. 13, 2000

[54] SERIAL INTERFACE READ-BACK DRIVE CIRCUIT

[75] Inventor: Jong-Gyu Chae, Suwon, Rep. of Korea

[73] Assignee: SamSung Electronics Co., Ltd., Suwon, Rep. of Korea

[21] Appl. No.: 08/941,731

[22] Filed: Oct. 1, 1997

[30] Foreign Application Priority Data

Oct. 1, 1996 [KR] Rep. of Korea ............... 96-43571

[51] Int. Cl.[7] ........................................ G11B 5/09
[52] U.S. Cl. ...................................... 360/46; 360/51
[58] Field of Search ................................ 360/51, 46

[56] References Cited

U.S. PATENT DOCUMENTS

| | | | |
|---|---|---|---|
| 4,244,008 | 1/1981 | Holt | 360/45 |
| 4,327,383 | 4/1982 | Holt | 360/45 |
| 4,875,112 | 10/1989 | Dost et al. | 360/65 |
| 5,084,789 | 1/1992 | Kamo et al. | 360/53 |
| 5,121,262 | 6/1992 | Squires et al. | 360/46 |
| 5,257,248 | 10/1993 | Ogasawara | 369/32 |
| 5,406,425 | 4/1995 | Johnston et al. | 360/48 |
| 5,424,881 | 6/1995 | Behrens et al. | 360/40 |
| 5,434,717 | 7/1995 | Yoshinaga et al. | 360/46 |
| 5,671,252 | 9/1997 | Kovacs et al. | 360/65 |
| 5,726,821 | 3/1998 | Cloke et al. | 360/46 |
| 5,870,591 | 2/1999 | Sawada | 360/51 |

*Primary Examiner*—Glenton B. Burgess
*Assistant Examiner*—Regina Y. Neal
*Attorney, Agent, or Firm*—Robert E. Bushnell, Esq.

[57] ABSTRACT

A serial interface read-back drive circuit for reading back the data stored in various control registers within the read/write channel circuit of a magnetic disk drive comprises a control unit for controlling the operation of the magnetic disk drive, a serial write interface circuit for providing serial data, a serial data enable signal and a serial clock signal to enable various control states of the read/write channel circuit under the control of the control unit, a read-back enable signal generating unit for generating a read-back enable signal by receiving a read-timing set value of the control unit, a serial clock signal and a serial data enable signal, and a read-back unit for reading back the data of the state control registers as applied to the control unit during the enable interval of the read-back enable signal when the control unit controls the read-back enable control.

10 Claims, 4 Drawing Sheets

SERIAL INTERFACE READ-BACK DRIVE CIRCUIT

CLAIM OF PRIORITY

This application makes reference to, incorporates the same herein, and claims all benefits accruing under 35 U.S.C. § 119 from an application for SERIAL INTERFACE READ-BACK DRIVE CIRCUIT earlier filed in the Korean Industrial Property Office on the $1^{st}$ of October 1996 and there duly assigned Ser. No. 43571/1996.

BACKGROUND OF THE INVENTION

1. Technical Field

The present invention relates to a magnetic disk drive, and more particularly a serial interface read-back drive circuit for reading back the data stored in the various registers within a read/write channel circuit.

2. Related Art

Recently, data storing and retrieving techniques have been rapidly and greatly improved so that high-capacity and high-speed storage devices, like hard disk drives, are manufactured and are widely employed as auxiliary storage devices for computer systems.

In magnetic disk drives, a read/write channel circuit detects and decodes data pulses from read signals transmitted by a preamplifier coupled to heads so as to apply them to the DDC (disk data controller), and conversely the read/write channel circuit decodes write data from the DDC to apply to the preamplifier. When retrieving data, the preamplifier amplifies signals picked up by heads from disks (recording medium) so as to apply them to the read/write channel circuit and, when recording data, the preamplifier selects a head in response to the instruction of the DDC so as to record the encoded write data received from the read/write channel circuit on the corresponding disk.

The read/write channel circuit controls the internal constituent circuits through an internal built-in serial port under the control of a central processing unit(CPU). Various states of the internal constituent circuit blocks of a read/write channel circuit are transferred through the serial port to the CPU. Namely, the above serial port is a bidirectional port which serially interfaces between the read/write channel circuit and the CPU.

By way of example, a read/write channel circuit includes an ENcoder/DECoder(ENDEC) which decodes recording data and encodes synchronous reading data, a pulse and servo detector which detects the amplitude of a burst to generate position error signals and detects peak values of amplitudes of the preamplified signals, and a data separator which separates read data, synchronized with specific clocks, from data pulses generated by the pulse and servo detector. The read/write channel circuit further includes an automatic gain control (AGC) circuit, a programmable filter, a hysteresis qualifier, etc. Each of the internal constituent circuits has respective registers for storing information used for operational control of the corresponding circuit.

The built-in serial port in the read/write channel circuit has n number of serial port registers (hereinafter referred to as "state control registers"). For example, n number of state control registers are respective registers for setting power-down, data mode cut-off, servo mode cut-off, filter boost, data threshold value, servo threshold value, data restoring, and AGC level, etc. Each of the registers has a specific control value for setting its corresponding function.

The CPU applies the serial port control signals, i.e. SDEN, SDATA and SCLK, to the above serial port, where SDEN is a data transmission enabling signal, SDATA is serial data of the CPU, and SCLK is a serial clock signal. The SDATA carries the address for selecting the specified state control register of the serial port and the data for reading (or writing) the control state of the register selected by the above address. The address of the serial data includes the read/write selection bits for controlling the data reading and/or writing selections.

When the serial port control signal is applied, the CPU accesses the state control register according to the address in the serial data SDATA and reads (or writes) the control state from (or to) the register accessed according to the data in the SDATA. The read or write selection is performed according to the binary logical state of the read/write selection bit in the address. If the control state is written, the serial port loads the above control state on the corresponding circuit of the read/write channel circuit. If the control state is read, the serial port loads the current control state of the accessed state control register on the serial data SDATA to transfer it to the CPU.

Since the read/write channel circuit is packed in a single chip which is specially designed by the manufacturer, it is natural that the bit numbers of the serial ports for interfacing between the read/write channel circuit and the CPU be different, depending on manufacturer. The bit numbers of the serial ports are, for example, 16 bits, 18 bits and 8 bits, which indicates a variety of serial port uses. FIG. 4 illustrates the serial port control signal in case of the serial port of 16 bits.

In order to serially interface between the conventional read/write channel circuits of various standards and the CPU according to the prior art, the related control designs of the CPU or DSP (digital signal processor) should be modified by adapting to the bit number of the serial port of the read/write channel circuit. Accordingly, to remove such inconveniences, it is desirable to devise a serial interface circuit which can be adapted to the read/write channel circuits of various standards.

For reference, a serial interface circuit for adaptively supporting the serial interface of the read/write channel circuits of various standards is disclosed in the Korean Patent Application No. 96-41480 under the title of "Serial Interface Circuit".

Although the above serial interface circuit disclosed in the Korean Patent Application No. 96-41480 supports adaptively the serial interface of the read/write channel circuits of various standards, the CPU cannot access the serial port register and read the contents thereof. In other words, the CPU supplies the state control registers with the serial port control signals adaptive to various interface bit numbers by means of the newly invented serial interface circuit, but cannot read the control state set in the state control register. Particularly in the test mode, where various information of the read/write channel circuit are loaded on the specific serial port, the CPU cannot access the above serial port.

The following U.S. patents disclose other arrangements which are representative of the prior art relative to the invention disclosed herein, but such arrangements are also burdened by the disadvantages discussed above: U.S. Pat. No. 5,671,252 to Kovacs et al., entitled *Sampled Data Read Channel Utilizing Charge-Coupled Devices*, U.S. Pat. No. 5,434,717 to Yoshinaga et al., entitled *Read And/Or Write Integrated Circuit Having An Operation Timing Adjusting Circuit And Constant Current Elements*, U.S. Pat. No. 5,424,881 to Behrens et al., entitled *Synchronous Read Channel*, U.S. Pat. No. 5,257,248 to Ogasawara, entitled

*Information Recording Apparatus Capable Of Efficiently Verifying Recording Information*, U.S. Pat. No. 5,121,262 to Squires et al., entitled *Disk Drive System Employing Adaptive Read/Write Channel Controls And Method Of Using Same*, U.S. Pat. No. 5,084,789 to Kamo et al., entitled *Parallel Transfer Type Disk System*, U.S. Pat. No. 4,875,112 to Dost et al., entitled *Compound Pulse Dimming Circuitry For Conditioning Readback Signals*, U.S. Pat. No. 4,327,383 to Holt, entitled *Read Circuit For A Floppy Disk Drive*, and U.S. Pat. No. 4,244,008 to Holt, entitled *Read Back Compensation Circuit For A Magnetic Recording Device*.

SUMMARY OF THE INVENTION

It is an object of the present invention to provide a serial interface read-back drive circuit for reading back contents of various registers within the read/write channel circuits of various standards.

It is another object of the present invention to provide a serial interface read-back drive circuit capable of accessing the current control state value and the internal signal processing state of the read/write channel circuit of various standards.

According to the present invention, a serial interface read-back drive circuit for reading back the data stored in various control registers within the read/write channel circuit of a magnetic disk drive, comprises: a control unit for controlling the operation of the magnetic disk drive; a serial write interface circuit for providing serial data, a serial data enable signal and a serial clock signal to enable various control states of the read/write channel circuit under the control of the control unit; a read-back enable signal generating unit for generating a read-back enable signal by receiving a read-timing set value of the control unit, the serial clock signal and the serial data enable signal; and a read-back unit for reading back the data of the state control registers applied to the control unit during the enable interval of the read-back enable signal when the control unit controls the read-back enable control.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

For the better understanding of the serial interface circuit according to the embodiment of the present invention, the construction of the conventional hard disk drive is first explained with reference to FIG. 4.

Figure 4:
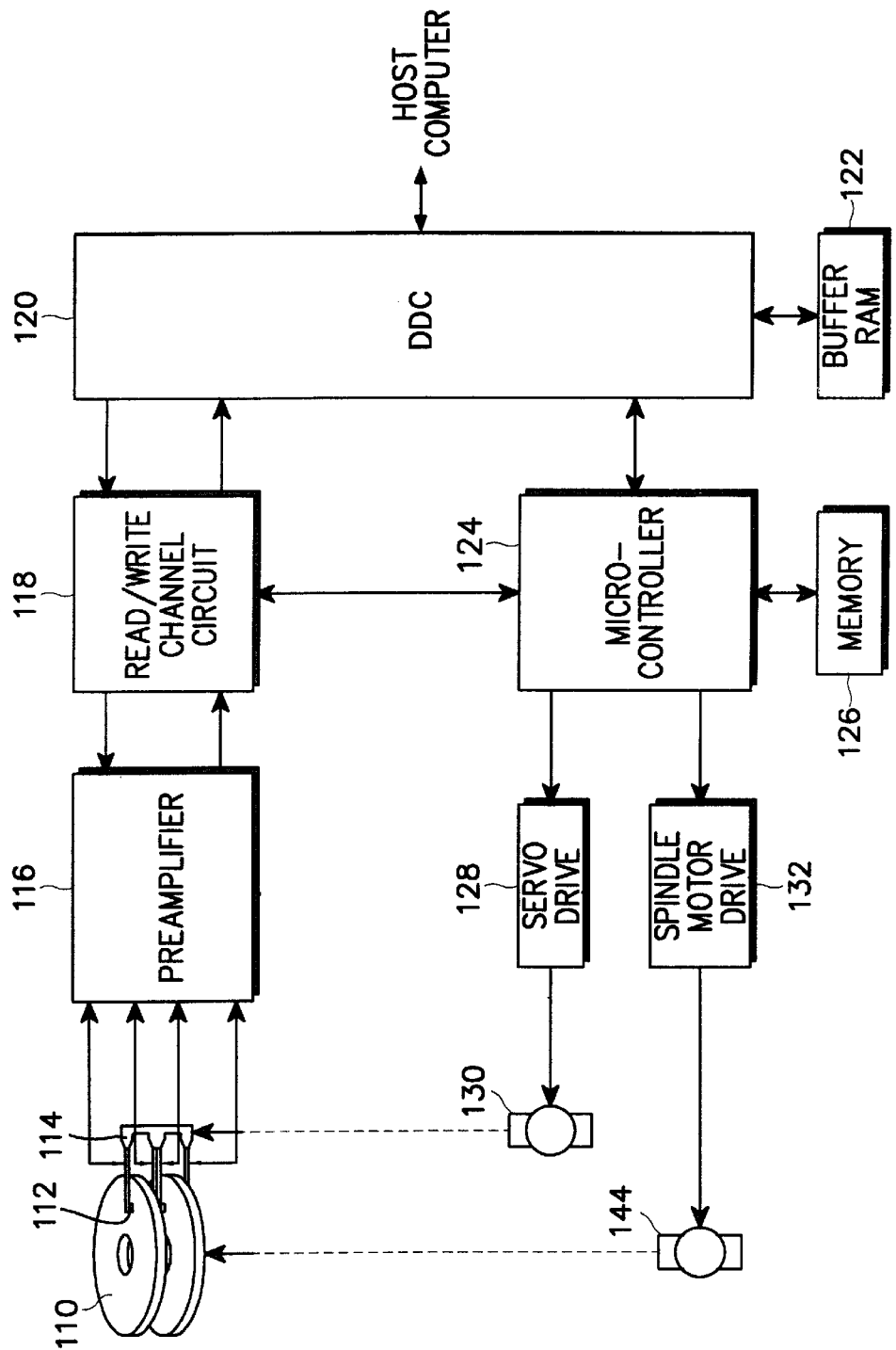
FIG. 4 is a block diagram illustrating a conventional hard disk drive.

Referring to FIG. 4, the disks 110 are rotated by a spindle motor 144. The heads 112 are each mounted on the respective support arms extending from the E-block assembly 114 coupled to the rotary voice coil actuator 130, and each head is positioned over the corresponding disk surface of disks 110. When reading, the preamplifier 116 amplifies the signals picked up by one of the heads 112 so as to apply the analog read signal to the read/write channel circuit; when writing, the preamplifier 116 writes the encoded write data received from the read/write channel circuit through the corresponding head 112 onto the disk 110. The read/write channel circuit detects and decodes the data pulses from the read signals applied by the preamplifier 116 so as to transmit the decoded data to the disk data controller (DDC) 120, and conversely, decodes the write data received from the DDC 120 so as to apply it to the preamplifier 116.

The DDC 120 writes data received from the host computer through the read/write channel circuit and the preamplifier 116 onto the disks, and conversely reads data from the disks for transfer to the host computer. Further, the DDC 120 interfaces bidirectional communications between the host computer and the microcontroller 124. The buffer RAM 122 temporarily stores data transmitted between the host computer and each of the microcontroller 124 and the read/write channel circuit 118. The microcontroller 124 controls the track seeking and following operations in response to the read or write instructions received from the host computer via DDC 120. The memory 126 stores execution programs and various setting values of the microcontroller 124. The servo drive 128 generates the drive current for driving the actuator 130 in response to the position control signal of the heads 112 supplied by the microcontroller 124 so as to apply drive current to the voice coil of actuator 130. The actuator 130 moves the heads 112 over the disks 110 in response to the direction and level of the drive current supplied by the servo drive 128. The spindle motor drive 132 drives the spindle motor 144 to rotate the disks 110.

Figure 1:
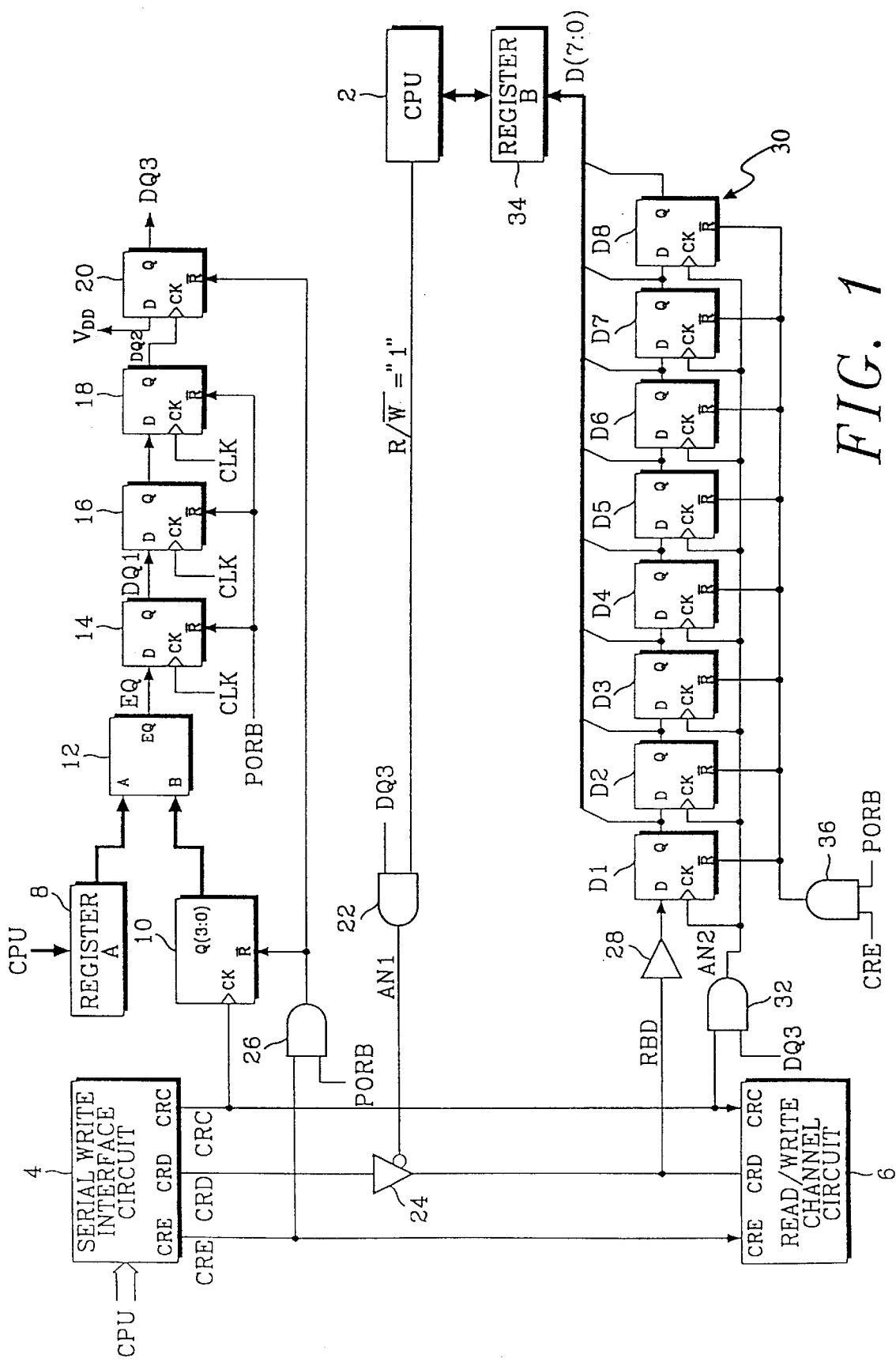
FIG. 1 is a block diagram of a serial interface read-back drive circuit according to an embodiment of the present invention.
Figure 3:
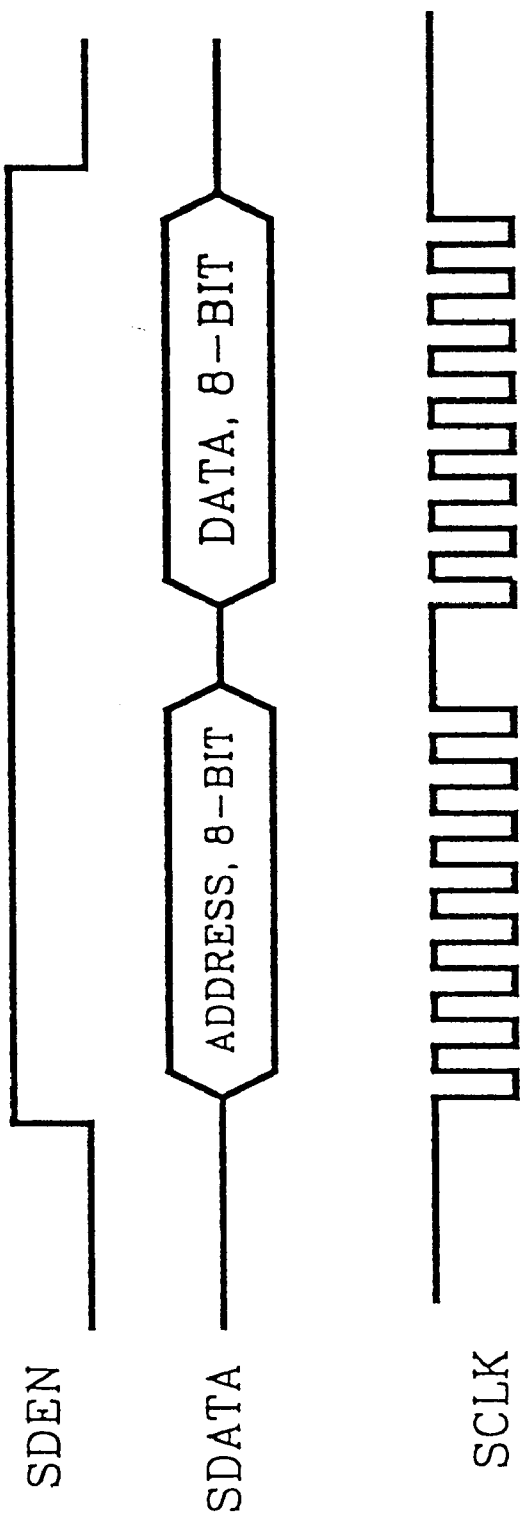
FIG. 3 is a transmission format diagram of the conventional serial port.

Referring to FIG. 1, the serial write interface circuit 4 is a circuit capable of interfacing between central processing units and read/write channel circuits of various standards, and such a serial interface circuit is disclosed in the preceding Korean Patent Application No. 96-41480. The above serial write interface circuit 4 outputs serial data SDATA, serial data enable signals SDEN and serial clock signals SCLK (shown in FIG. 3) for enabling various state controls so as to apply them to a read/write channel circuit 6 of a predetermined standard under the control of CPU 2. The serial data, the serial data enable signals and the serial clock signals are applied to the serial port of the read/write channel circuit 6 to control the state control registers within the serial port.

Accordingly, hereinafter, the serial data are renamed as control register data (CRD), the serial clock signal is renamed as a control register clock signal (CRC), and the serial data enable signal is renamed as a control register enable signal (CRE).

Figure 2:
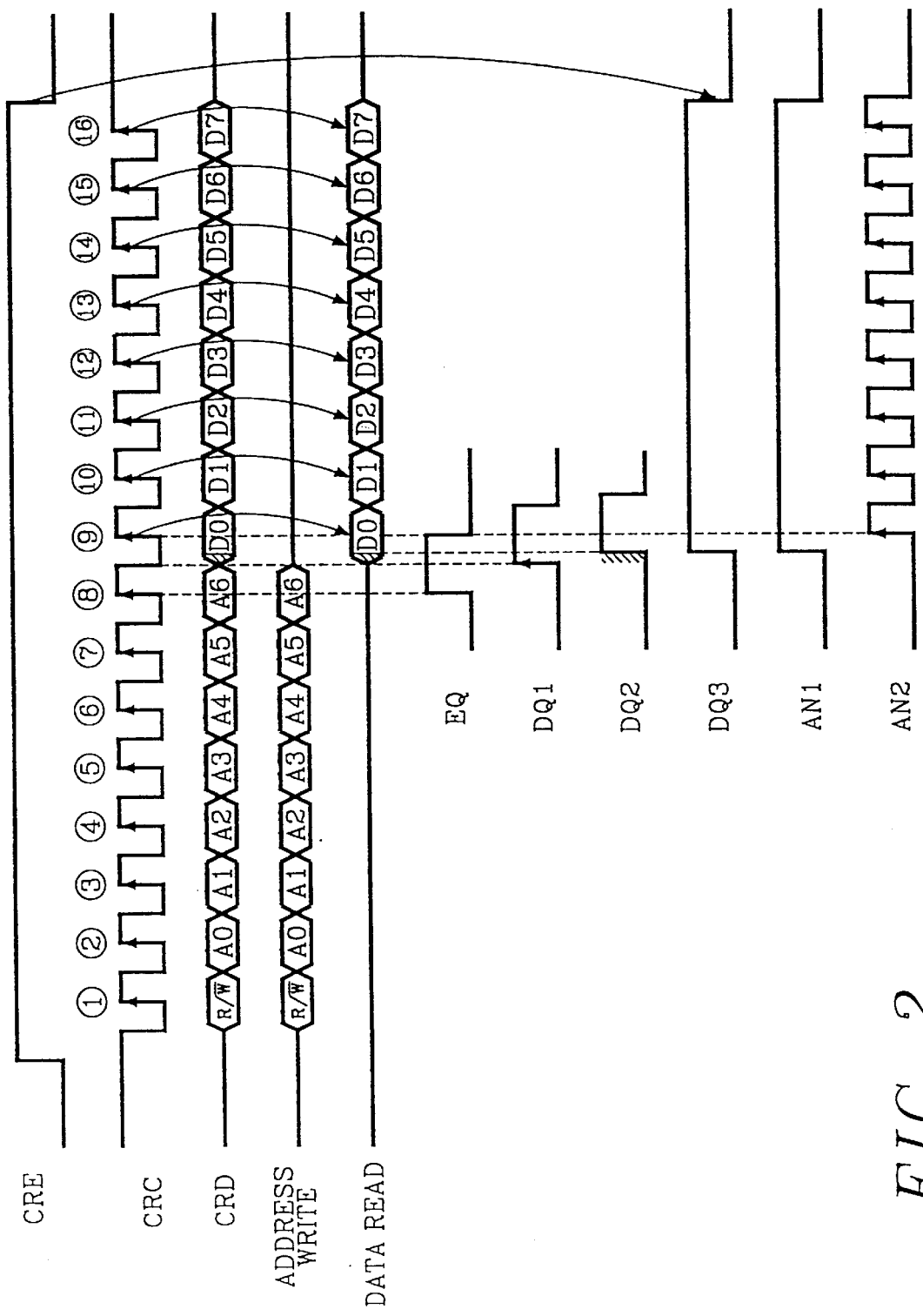
FIG. 2 is a timing chart with waveforms according to an embodiment of the present invention.

Describing an embodiment of the present invention, the interface bit standard of the read/write channel circuit 6 is set to 16 bits. The control register enable signal (CRE), the control register clock signal (CRC) and the control register data (CRD) output of the serial write interface circuit 4 are as shown in FIG. 2. The control register data (CRD) consists of 16 bits, wherein the first bit $R\sqrt{W}$ is intended as a read/write select bit, the next seven bits A0~A6 are intended as an address, and the last eight bits D0~D7 are intended as data. Namely, the address bits A0~A6 represent a signal for selecting the specific state control register of the serial port within the read/write channel circuit 6 of 16 bit type, and the data bits D0~D7 represent an information for reading (or writing) the control state of the state control register selected by the above address bits A0~A6. The above read/write select bit R√W̄ is a bit for controlling the selection of read or write. Additionally, the control register data (CRD) corresponds to the rising edges of the control register clock signal (CRC).

The serial write interface circuit 4 (FIG. 1) transmits the control register data (CRD), the control register clock signal (CRC) and the control register enable signal (CRE) to the read/write channel circuit 6 under the control of CPU 2. In order to read back various states of the state registers of the read/write channel circuit 6 according to the present invention, the read/write select bit R√W̄ of the above control register data (CRD) is set to a logical "high" value.

Thereafter, CPU 2 loads the read timing value "8" on the register A 8. The timing set value "8" is equal to the data bit number from the control register data (CRD) consisting of 16 bits. The timing set value "8" of the register A 8 is applied to the input terminal A of the comparator 12. Besides, the control register clock signal (CRC) is applied to the clock terminal CK of the counter 10. Accordingly, the counter 10 counts the control register clock signal (CRC) and applies the counted value to the input terminal B of the comparator 12. The comparator 12 outputs a signal EQ as shown in FIG. 2 when the counted value is equal to the above timing set value, i.e. to "8". The signal EQ is applied to the clock terminal CK of the D-type flip-flop 20 through the D-type flip-flops 14, 16, 18 which are operated in response to the clock CLK. As shown in FIG. 2, the output of the D-type flip-flop 14 is DQ1, and the output of the D-type flip-flop 18 is DQ2.

The input terminal of the D-type flip-flop 20 is connected to a pull-up power source $V_{DD}$ and produces an output signal DQ3 in a logical "high" state at the rising edge of the signal DQ2 applied to the clock terminal CK, and then outputs the above output signal DQ3 in a logical "low" state at the disable time of the control register enable signal (CRE) transmitted from the serial write interface circuit 4. The output signal DQ3 of the D-type flip-flop 20, as shown in FIG. 2, is applied to one input of the AND gate 22, as shown in FIG. 1.

The read/write select signal R√W̄ transmitted from CPU 2 is applied in a logical "high" state to the other input of the AND gate 22. Accordingly, the AND gate 22 logically combines the output signal DQ3 of the D-type flip-flop 20 with the read/write select signal R√W̄ so as to produce the output signal AN1 applied to the buffer 24. Therefore, the buffer 24 is disabled when AN1 is in a logical "high" state.

Referring to FIG. 2, the interval during which the output signal AN1 of the AND gate 22 is in the logical "high" state corresponds to the data interval D0~D7 of the control register data (CRD) applied to the read/write channel circuit 6. During this interval, since the buffer 24 is disabled, the data D0~D7 are not transferred to the read/write channel circuit 6, and only the read/write select bit R√W̄ of CRD and the address A0~A6 are transferred to the read/write channel circuit 6. Namely, this interval is the enable interval for reading back the data of the specific control register within the read/write channel circuit 6.

The serial port of the read/write channel circuit 6 accesses the state control register of the corresponding address according to the read/write select bit R√W̄ and the address A0~A6 of the control register data (CRD) transferred from the serial write interface circuit 4, and reads data from the above state control register so as to provide an output to the CRD terminal of the read/write channel circuit 6. The output data transmitted to the CRD terminal are the serial read-back data (RBD) applied to the serial/parallel converter 30 through the buffer 28. The output signal DQ3 of the D-type flip-flop 20 is logically combined with the control register clock signal (CRC) by AND gate 32. The output signal of the AND gate 32, shown as a signal AN2 in FIG. 2, serves as a clock signal to the serial/parallel converter 30 during the read enable interval.

The above serial/parallel converter 30 consists of eight D-type flip-flops D1~D8, and is shifted by synchronizing with the clock signal AN2 transmitted from the AND gate 32, thereby converting the above serial read-back data (RBD) into the parallel read-back data D(7:0) which is provided as an output to the register B 34. The above parallel read-back data D(7:0), temporarily stored in the register B 34, are read by CPU 2.

Referring to FIG. 1, the AND gate 26 logically combines the power reset signal PORB and the control register enable signal (CRE) and applies the result to the reset terminal R̄ of the counter 10 and the D-type flip-flop 20, whereby the above power reset signal PORB is applied in a logical "low" state when power is off. Therefore, the counter 10 and the D-type flip-flop 20 are initialized by the power reset signal PORB or the control register enable signal (CRE). Further, the power reset signal PORB is applied to the reset terminals R̄ of the D-type flip-flops 14, 16, 18. The AND gate 36 logically combines the power reset signal PORB and the control register enable signal (CRE) and applies the result to the reset terminals R̄ of the D-type flip-flops D1 D8 of the serial/parallel converter 30. Accordingly, the above serial/parallel converter 30 is initialized by the power reset signal PORB or the control register enable signal (CRE).

Although the present invention is explained with reference to a specific embodiment of the inventive serial interface read-back drive circuit for the read/write channel circuit of 16 bits type, it is apparent to those skilled in the art that the inventive serial interface read-back drive circuit is applicable to any read/write channel circuits of various standards according to the present invention.

What is claimed is:

1. A serial interface read-back drive circuit for reading back data stored in state control registers within a read/write channel circuit of a magnetic disk drive, comprising:

control means for controlling the operation of said magnetic disk drive and for generating a read-timing set value;

serial write interface means for providing serial data, a serial data enable signal and a serial clock signal to enable various control states of said read/write channel circuit under the control of said control means;

read-back enable signal generating means responsive to the read-timing set value, the serial clock signal and the serial data enable signal for generating a read-back enable signal defining a read-back enable interval; and read-back unit means responsive to the read-back enable signal for reading back the data of said state control registers during the read-back enable interval;

wherein said read-back enable signal generating means comprises:

a register for temporarily storing the read-timing set value of said control means;

a counter for receiving the serial clock signal from the serial write interface means and for counting in accordance therewith to produce an output value;

a comparator for generating a read timing start signal when the output value of said counter corresponds to said read-timing set value from said register; and a signal forming circuit for generating the read-back enable signal in accordance with the serial data enable signal from said serial write interface means and said read-timing start signal, and for ceasing generation of the read-back enable signal once the serial data enable signal is disabled.

2. A serial interface read-back drive circuit as defined in claim 1, wherein said signal forming circuit comprises:

a plurality of flip-flops for latching said read-timing start signal and having an output; and a flip-flop for generating a high state corresponding to pull-up power applied to an input terminal of said flip-flop by using the output of said plurality of flip-flops as a clock signal, and for generating a low state in response to disabling of the serial data enable signal.

3. A serial interface read-back drive circuit for reading back data stored in state control registers within a read/write channel circuit of a magnetic disk drive, comprising:

control means for controlling the operation of said magnetic disk drive and for generating a read-timing set value;

serial write interface means for providing serial data, a serial data enable signal and a serial clock signal to enable various control states of said read/write channel circuit under the control of said control means;

read-back enable signal generating means responsive to the read-timing set value, the serial clock signal and the serial data enable signal for generating a read-back enable signal defining a read-back enable interval; and read-back unit means responsive to the read-back enable signal for reading back the data of said state control registers during the read-back enable interval;

wherein said read-back unit means comprises:

a serial/parallel conversion unit for converting serial data of said state control registers received from said read/write channel circuit into parallel read-back data in synchronization with said serial clock signal so as to output said read-back data in parallel; and a register for temporarily storing an output of said serial/parallel conversion unit for further transmission to said control means.

4. A serial interface read-back drive circuit as defined in claim 3, wherein said read-back unit means further comprises a buffer at an input of said serial/parallel conversion unit.

5. A serial interface read-back drive circuit for reading back data stored in state control registers within a read/write channel circuit of a magnetic disk drive, said magnetic disk drive being controlled by a central processing unit which generates a read-timing set value, said circuit comprising:

serial write interface means connected to said central processing unit and to said read/write channel circuit for providing serial data, a serial data enable signal and a serial clock signal to enable various control states of said read/write channel circuit;

read-back enable signal generating means responsive to the read-timing set value, the serial clock signal and the serial data enable signal for generating a read-back enable signal defining a read-back enable interval; and read-back unit means responsive to the read-back enable signal for reading back the data of said state control registers during the read-back enable interval;

wherein said read-back enable signal generating means comprises:

a register for temporarily storing the read-timing set value received from said central processing unit;

a counter responsive to said serial clock signal for generating a clock output;

a comparator connected to said register and to said counter for generating a read timing start signal in response to the clock output of said counter and the read-timing set value from said register; and a signal forming circuit connected to said comparator and responsive to the read timing start signal for generating the read-back enable signal defining the read-back enable interval.

6. A serial interface read-back drive circuit as defined in claim 5, wherein said signal forming circuit comprises:

a plurality of flip-flops for latching said read-timing start signal and having an output; and a flip-flop responsive to the output of said plurality of flip-flops for generating a high state corresponding to pull-up power applied to an input terminal of said flip-flop, and for generating a low state in response to disabling of the serial data enable signal.

7. A serial interface read-back drive circuit as defined in claim 6, wherein said signal forming circuit further comprises:

an AND gate responsive to the high state generated by said flip-flop in combination with a read/write select bit provided by said central processing unit;

said serial interface read-back drive circuit further comprising a buffer connected between said serial write interface means and said read/write channel circuit for conveying said serial data from said serial write interface means to said read/write channel circuit;

wherein operation of said buffer is disabled when said AND gate generates a high output, and wherein operation of said buffer is enabled in response to generation of a low output by said AND gate.

8. A serial interface read-back drive circuit for reading back data stored in state control registers within a read/write channel circuit of a magnetic disk drive, said magnetic disk drive being controlled by a central processing unit which generates a read-timing set value, said circuit comprising:

serial write interface means connected to said central processing unit and to said read/write channel circuit for providing serial data, a serial data enable signal and a serial clock signal to enable various control states of said read/write channel circuit;

read-back enable signal generating means responsive to the read-timing set value, the serial clock signal and the serial data enable signal for generating a read-back enable signal defining a read-back enable interval; and read-back unit means responsive to the read-back enable signal for reading back the data of said state control registers during the read-back enable interval;

wherein said read-back unit means comprises:

a serial/parallel conversion unit for converting serial data of said state control registers received from said read/write channel circuit into parallel read-back data in synchronization with said serial clock signal so as to output said read-back data in parallel; and a register for temporarily storing an output of said serial/parallel conversion unit for further transmission to said control means.

9. A serial interface read-back drive circuit as defined in claim 8, wherein said read-back unit means further comprises an AND gate having a first input connected to said serial write interface means for receiving said serial clock signal, and having a second input connected to an output of said signal forming circuit for receiving the read-back enable signal, said AND gate generating a clock input for clocking said serial/parallel conversion unit.

10. A serial interface read-back drive circuit as defined in claim 8, wherein said read-back unit means further comprises a gate having a first input connected to said serial write interface means for receiving a clock register enable signal therefrom, and having a second input for receiving a power reset signal, said gate having an output connected to said serial/parallel conversion unit for initializing said serial/parallel conversion unit in response to one of said clock register enable signal and said power reset signal.

* * * * *